US006391370B1

(12) United States Patent
Rogers et al.

(10) Patent No.: US 6,391,370 B1
(45) Date of Patent: May 21, 2002

(54) MICROMILLING PLANT STEROLS AND EMULSIFIERS

(75) Inventors: Richard B. Rogers, Chicago; John B. Topinka, Des Plaines, both of IL (US); Elizabeth Gwartney, Littleton, CO (US); Johnny Casanovas, Des Plaines, IL (US); Scott T. Ostergaard, Racine, WI (US); Daniel G. Lis, Schaumburg, IL (US); John A. DeWalt, South Holland, IL (US); Anilkumar G. Gaonkar, Buffalo Grove, IL (US)

(73) Assignee: Kraft Foods, Inc., Northfield, IL (US)

( * ) Notice: Subject to any disclaimer, the term of this patent is extended or adjusted under 35 U.S.C. 154(b) by 0 days.

(21) Appl. No.: 09/543,946

(22) Filed: Apr. 6, 2000

Related U.S. Application Data

(60) Provisional application No. 60/165,338, filed on Nov. 12, 1999.

(51) Int. Cl.$^7$ ................................................. A23D 9/00
(52) U.S. Cl. ................ 426/611; 426/602; 514/170; 514/182; 514/559; 552/544; 552/546; 552/547
(58) Field of Search ................ 426/611, 602; 552/544–547; 514/170, 171, 182, 559

(56) References Cited

U.S. PATENT DOCUMENTS

| 3,881,005 A | * | 4/1975 | Thakkar et al. ............. 424/238 |
| 4,160,850 A | * | 7/1979 | Hallstrom et al. ........... 426/601 |
| 4,195,084 A | * | 3/1980 | Ong ............................ 424/238 |
| 5,892,068 A | * | 4/1999 | Higgins, III ................. 552/554 |
| 5,932,562 A | * | 8/1999 | Ostlund, Jr. ................. 514/78 |
| 6,031,118 A | * | 2/2000 | van Amerongen et al. . 552/544 |
| 6,087,353 A | * | 7/2000 | Stewart et al. .............. 514/182 |
| 6,242,001 B1 | * | 6/2001 | Bruce et al. ................. 424/464 |

FOREIGN PATENT DOCUMENTS

EP 08399458 * 6/1998

OTHER PUBLICATIONS

Derwent Abstract No 1992–154549. Fat contg plant sterol–for injectional pharmaceuticals activating automonic nerve and lowering lipid levels.*

* cited by examiner

*Primary Examiner*—Carolyn Paden
(74) *Attorney, Agent, or Firm*—Fitch, Even, Tabin & Flannery

(57) ABSTRACT

Plant sterols have been shown to be cholesterol-reducing agents in human serum. In the present invention, plant sterols, plant stanols, plant sterol esters and other non-toxic sterols are micromilled with emulsifiers in a solvent (water or edible oil) to produce dispersion which can be incorporated into full-fat, reduced-fat, low-fat, fat-free and triglyceride-free food products. Such water-based or edible oil-based dispersions can be used to incorporate relatively high levels of such sterols/stanols in food products without the adverse organoleptic effect normally associated with the use of such plant sterols and plant stanols.

56 Claims, No Drawings

MICROMILLING PLANT STEROLS AND EMULSIFIERS

RELATED APPLICATIONS

This application is based on, and claims benefit of, U.S. Provisional Patent Application Serial No. 60/165/338, filed on Nov. 12, 1999.

FIELD OF THE INVENTION

The present invention relates to micromilling of free plant sterols and/or plant stanols in the presence of emulsifiers to provide oil or aqueous suspensions or dispersions which can be used directly in food compositions. Such oil or aqueous dispersions of plant sterols and/or plant stanols may be used as cholesterol-reducing agents to generate full fat, low-fat, fat-free, and triglyceride-free food products which deliver relatively high levels of the cholesterol-reducing agents.

BACKGROUND OF THE INVENTION

Cholesterol has been known for many years to be a component of atherosclerotic plaques. Mounting evidence indicates diets high in cholesterol may increase the levels of cholesterol in the blood which, in turn, increase the risk of atherosclerotic disease and its attendant manifestations of heart attack, stroke and other tissue injuries resulting from atherosclerosis. Cholesterol absorbed from dietary sources is thought to increase the risk of atherosclerotic disease.

Other than avoidance or reduced consumption of high cholesterol foods, measures available without prescription to the general public to reduce the absorption of cholesterol from the diet have met with little success. Furthermore, in many cases, high serum cholesterol cannot be reduced by lowering dietary cholesterol. However, high cholesterol levels in serum can be lowered effectively by altering the intestinal metabolism of lipids. In recent years, it has become known that certain plant sterols and plant stanols such as β-sitosterol (24-ethyl-5-cholestene-3β-ol) and its hydrogenated form (β-sitostanol (24-ethyl-5α-cholestane-3β-ol) can help lower serum cholesterol by inhibiting cholesterol absorption in the digestive system. Plant stanols are the hydrogenated form of plant sterols. See, e.g., "Reduction of Serum Cholesterol With Sito Stanol-Ester Margarine in a Mildly Hypercholesterolemic Population", *New England Journal of Medicine*, Nov. 16,1995, pp. 1308–1312; "Short-Term Administration of Tall Oil Phytosterols Improves Plasma Lipid Profiles in Subjects with Different Cholesterol Levels," *Metabolism*, Vol.47, No. 6 (June), 1998, pp.751–756; and "Cholesterol-lowering Efficiency of a Sitostanol-containing Phytosterol Mixture with a Prudent Diet in Hyperlipidemic Men," *Am. J. Clin. Nutr.*, 1999, 1144–50.

The use of plant sterols, which are natural components of vegetable fats and oils, in food products is considered safe. Plant sterols themselves are not absorbed—or only absorbed in very small amounts—from the intestines. A decreased incidence of coronary disease is clearly associated with a decrease in serum cholesterol and, in particular, a decrease in LDL cholesterol. A high serum cholesterol level is one of the most significant indicators of risk of coronary disease. There are a variety of naturally occurring plant sterols which have been reported to have a cholesterol-reducing effect, although not all have equivalent action.

Although the mechanism by which plant sterols achieve the effect of lowering serum cholesterol has not been fully elucidated and not wishing to be limited by theory, it is believed that plant sterols interfere with cholesterol absorption by competition-type mechanisms. Cholesterol absorption appears to take place primarily in the proximal third of the small intestine. Cholesterol esters must be converted to their free hydroxyl form by the action of cholesterol esterases before they can be absorbed. The free cholesterol requires bile salts for solubilization and absorption. Bile salts form an aqueous dispersion of micelles in which the cholesterol is solubilized along with phospholipids and hydrolysis products of other dietary lipids. Micelles transport the cholesterol across the hydrophilic barrier (the unstirred water layer) to reach the surface of the intestinal mucosa. At the mucosa, it is thought that the cholesterol dissociates from the micelle and is transported into the mucosa cells by a process which has not yet been fully defined but may include passive exchange diffusion or by protein-mediated transport. Plant sterols could interfere with cholesterol absorption by either of, or by both of, the following general mechanisms: (a) competition with cholesterol for absorption into the bile-salt micelles or (b) competition with the transport mechanism into the mucosa cells.

Conventionally, plant sterols have been incorporated into food products by melting a sterol or stanol, incorporating it into an oil phase, and blending the oil phase with other components to result in a plant sterol-containing food product. However, the plant sterols generally have high melting points (i.e., about 130–180° C.) which can result in significant crystallization of the plant sterols within the oil phase of such food products. Such crystallization results in food products with a gritty and unacceptable texture. This gritty texture is especially detectable when the oil/plant sterol phase is incorporated at high levels in the food product. The high melting points and hydrophobic nature of such plant sterols also makes it difficult to blend such plant sterols with an aqueous phase. Furthermore, actual melting of the plant sterol for incorporation into food products is energy intensive. Attempts have been made to solve these problems using, for example, chemical modification of the plant sterols. For example, esterification of plant sterols generally results in lowered melting temperatures. Thus, such plant sterol esters generally may be incorporated into food products more readily due to the lower melting points and can provide food products without significant gritty texture.

More recently, several different approaches have been used to incorporate plant sterols into food products. For example, copending U.S. Application Ser. No. 09/324,702 (filed Jun. 2, 1999) provides plant sterol and/or plant stanol complexes or blends which are generated by co-crystallization of the plant sterols or plant stanols with one or more emulsifiers. More specifically, the plant sterol-emulsifier complexes were prepared by mixing plant sterol and emulsifier in the ratio of about two parts plant sterol to about one part emulsifier to a ratio of about one part plant sterol to about two parts emulsifier, adding about 0 to about 80 percent of a triglyceride oil, heating the mixture until it melts, and co-crystallizing the melted mixture to form the plant sterol-emulsifier complex. Such plant sterol-emulsifier complexes have melting temperatures at least 30° C. below that of the plant sterol and can be incorporated into food products without the grittiness normally associated with plant sterols or plant stanols.

European Patent Application EP 0 896 671 A (published Feb. 24, 1999) provides an aqueous dispersion of phytosterols by melting the phytosterols and emulsifiers to form a molten mixture and then dispersing the molten mixture in water using high shear. It was reported "that the step of melting the high melting phytosterols with surfactant prior to dispersion in water with or without surfactant contributes importantly to the ability to prepare a very fine dispersion with the use of high shear mixing or homogenization of the phytosterol or other melting lipid." The phytosterols are reported to have particle sizes of less than 15 microns and preferably less than 10 microns in aqueous dispersions. Such phytosterol dispersions could be incorporated into food products without the grittiness normally associated with phytosterols.

It would be desirable, therefore, to provide additional forms of plant sterols which can be incorporated into food products at relatively high levels without adversely affecting texture or other organoleptic properties. It would also be desirable to provide forms of plant sterols which can more easily be incorporated into food products. It would also be desirable to provide forms of plant sterols which can more easily be incorporated into food products without requiring significant modification of existing food production lines or methods. It would also be desirable to provide methods for preparing such plant sterols without chemical modification of the plant sterol itself. It would also be desirable to provide methods for preparing such plant sterols without heating or melting of the plant sterols. It would also be desirable to provide forms of plant sterols in either aqueous or oil dispersions as desired. The present invention provides such plant sterols and methods for preparing them.

SUMMARY OF THE INVENTION

The present invention relates to full-fat, low-fat, fat-free, and triglyceride-free food products which incorporate plant sterols as cholesterol-reducing compounds. The cholesterol-reducing compounds are incorporated into such food products by adding them as oil or aqueous dispersions of micromilled plant sterol and emulsifier mixtures. The micromilled plant sterol and emulsifier blends can be incorporated into full-fat, low-fat, fat-free, and triglyceride-free food products. Methods for making such micromilled plant sterols and food products which incorporate such micromilled plant sterols are also provided. These methods can also be used to prepare oil or aqueous dispersions of high melting lipids The micromilled sterols of this invention can be prepared using sterols, esterified sterols, and mixtures thereof. The invention, however, appears to be used to its greatest advantage when employing non-esterified sterols. The plant sterol esters have relatively lower melting points than the plant sterols themselves and can more readily be dissolved in oil phases. To a large extent, they do not pose significant problems of solubilization and dispersion in food products comprising water-in-oil or oil-in-water emulsions. However, more of the esterified plant sterols by weight are required, in comparison with the free plant sterols, to lower serum cholesterol because the ester portion of the molecule does not appear to be effective in the lowering of serum cholesterol. Thus, the present invention is important as it allows the use of unmodified plant sterols (i.e., free sterols) in food products in a form (i.e., micromilled particles) that competes more effectively with cholesterol for absorption by the intestinal mucosa. The present invention can be used, however and if desired, to incorporate higher levels of esterified plant sterols than has generally been possible in the past.

The plant sterol-emulsifier mixtures of the present invention can be prepared by mixing about 75 to about 99.9 percent plant sterol and about 0.1 to about 25 percent emulsifier, dispersing the plant sterol and emulsifier mixture in an aqueous phase or an oil phase, and then micromilling the aqueous or oil phase to provide an aqueous or oil dispersion of the plant sterol. If desired, the aqueous phase or oil phase can be mixed with the emulsifier followed by addition of the plant sterol; the resulting mixture is then micromilled. When preparing the plant sterol-emulsifier mixtures of this invention using water as the solvent, the emulsifier and plant sterol should be co-micromilled. However, when preparing plant sterol-emulsifier mixtures of this invention using edible oil as the solvent, the emulsifier can be added to the plant sterol/edible oil mixtures either before or after the micromilling step. It is generally preferred, however, that the emulsifier is present in the oil mixtures during micromilling. Preferably, the average particle size of the micromilled plant sterol/emulsifier dispersion is about 1 to about 40 microns, more preferably about 1 to about 20 microns, and most preferably about 1 to about 10 microns. It is generally preferred that the temperature during micromilling be kept at, close to, or below ambient temperature (i.e., about 20 to about 50° C., more preferably about 20 to 30° C., and even more preferably about 23 to about 27° C. for at, close to, or below ambient temperature; and below about 20° C., and more preferably at about 0 to about 15° C. for temperatures below ambient). In some cases, micromilling at temperatures below ambient temperatures may provide lower particle sizes. Temperature control, if needed, can be provided using any conventional technique or apparatus (e.g., coolant jacketed micromilling apparatus, heat exchangers, cooling baths, and the like). Plant sterol-emulsifier dispersions in water or edible oil can be prepared with plant sterols as well as esterified plant sterols. Preferably the plant sterol-emulsifier dispersions are prepared with the non-esterified plant sterols.

For purposes of this invention, "plant sterols" is intended to include both plant sterols and plant stanols; the term "sterols" alone is intended to include only the plant sterols; and the term "stanols" alone is intended to include only the plant stanols. The inherently non-absorbable sterols are not necessarily limited to the conventional plant sterols (i.e., sterols and stanols) but encompass all nontoxic sterols and like compounds which compete with cholesterol for occupancy in the oil droplets of the bile-salt micelles, according to current theory, thereby promoting crystallization of cholesterol in the intestine so that it may be excreted without absorption. Furthermore, for purposes of this invention, the term "plant sterols" is intended to include both the non-esterified and the esterified form of any of the plant sterols mentioned herein above.

Due to their small average particle size and large surface to mass ratio, the micromilled plant sterol dispersions of this invention are ideally suited for use as cholesterol-reducing agents. The present invention provides such micromilled plant sterols as either aqueous-based or oil-based dispersions. The plant sterol-emulsifier dispersions may be added directly to food products. Moreover, such plant sterol-emulsifier dispersions can generally be added to food products without requiring significant modification to either the food products or to the existing production line used for preparing such food products. Indeed, the plant sterol dispersions of this invention can supply at least a portion of the water and/or oil normally used in preparation of the food product. For food products containing both aqueous and oil phases, both aqueous plant sterol dispersion and oil-based plant sterol dispersions can be used if desired. Generally, the amount of bulk water and/or edible oil component added can be adjusted to account for the amounts added in the form of the plant sterol dispersions to maintain the water/oil content in the desired range. The present invention provides plant sterol-containing food products wherein the plant sterol is present in an amount sufficient to reduce serum cholesterol levels in a human consuming such food products. In addition, the present invention provides methods for generating plant sterol-emulsifier aqueous or oil dispersions for use in food products. Moreover, the present invention provides food products generated by incorporating the plant sterol-emulsifier dispersions into the food products.

It is, therefore, an object of the present disclosure to provide a plant sterol-emulsifier dispersion suitable for incorporation into food products, said plant sterol-emulsifier dispersion comprising about 20 to about 80 percent of a mixture of plant sterol and emulsifier, and about 20 to about 80 percent of a solvent, wherein the mixture is micromilled at, close to, or below ambient temperatures to form the plant sterol-emulsifier dispersion having an average particle size of about 1 to about 40 microns, wherein the solvent is water or an edible oil, and wherein the plant sterol-emulsifier dispersion can be incorporated into food products in an amount effective to reduce serum cholesterol levels in a human consuming the food products without adversely modifying the texture of the food products. Preferably, the average particle size of the plant sterol in the plant sterol-emulsifier dispersion is about 1 to about 20 microns and, more preferably, about 1 to about 10 microns.

It is another object of the present invention to provide a plant sterol-emulsifier dispersion suitable for incorporation into food products, wherein a blend of about 75 to about 99.9 percent plant sterol and about 0.1 to about 25 percent emulsifier is micromilled in water or an edible oil and at, close to, or below ambient temperature to form the plant sterol-emulsifier dispersion having an average particle size of about 1 to about 40 microns, wherein the plant sterol-emulsifier dispersion can be directly incorporated into food products in an amount effective to reduce serum cholesterol levels in a human consuming such food products, without adversely modifying the texture of the food products. Preferably, the average particle size of the plant sterol in the plant sterol-emulsifier dispersion is about 1 to about 20 microns and, more preferably, about 1 to about 10 microns.

It is another object of the present invention to provide a plant sterol-emulsifier dispersion suitable for incorporation into food products, said plant sterol-emulsifier dispersion comprising about 0.1 to about 80 percent plant sterol, about 0.1 to about 15 percent emulsifier, and about 20 to about 99 percent edible oil, wherein the plant sterol and the edible oil are micromilled at, close to, or below ambient temperature to form an edible oil dispersion having an average particle size of about 1 to about 40 microns and wherein the emulsifier is then incorporated into the edible oil dispersion to form the plant sterol-emulsifier dispersion; whereby the plant sterol-emulsifier dispersion can be directly incorporated into food products in an amount effective to reduce serum cholesterol levels in a human consuming such food products, without adversely modifying the texture of the food products.

Preferably, the average particle size of the plant sterol in the plant sterol-emulisifier dispersion is about 1 to about 20 microns and, more preferably, about 1 to about 10 microns.

It is a further object of the present disclosure to provide a method of forming a plant sterol-emulsifier dispersion for use in a food product, said method comprising (1) forming a first mixture of about 75 to about 99.9 percent plant sterol and about 0.1 to about 25 percent emulsifier, (2) mixing the first mixture with water or an edible oil to form a second mixture, and (3) micromilling the second mixture at, close to, or below ambient temperature to form the plant sterol-emulsifier dispersion, wherein the average particle size of the plant sterol-emulsifier dispersion is about 1 to about 40 microns, wherein the plant sterol-emulsifier dispersion can be directly incorporated into the food product in an amount effective to reduce serum cholesterol levels in a human consuming such food product, without adversely modifying the texture of the food product.

It is a further object of the present disclosure to provide a method of forming a plant sterol-emulsifier dispersion for use in a food product, said method comprising (1) forming a mixture of about 0.1 to about 80 percent plant sterol, about 0.1 to about 15 percent emulsifier, and about 20 to about 99 percent of water or an edible oil and (2) micromilling the mixture at, close to, or below ambient temperature to form the plant sterol-emulsifier dispersion, wherein the average particle size of the plant sterol-emulsifier dispersion is about 1 to about 40 microns, wherein the plant sterol-emulsifier dispersion can be directly incorporated into the food product in an amount effective to reduce serum cholesterol levels in a human consuming such food product, without adversely modifying the texture of the food product.

Still yet another object of the present invention is to provide a food product containing a cholesterol-reducing amount of a plant sterol wherein the plant sterol is incorporated into the food product using a water or edible oil dispersion of plant sterol, wherein the dispersion is prepared by micromilling a mixture of the plant sterol and an emulsifier in water or edible oil at, close to, or below ambient temperature to achieve an average particle size of about 1 to about 40 microns, and wherein the plant sterol dispersion does not adversely affect the texture of the food product. It is also an object of the present invention to provide a food product containing a cholesterol-reducing amount of a plant sterol wherein the plant sterol is incorporated as a plant sterol-emulsifier dispersion and the plant sterol is in a form that is readily available in the intestines to exchange with micellar cholesterol. Plant sterols incorporated into the plant sterol-emulsifier dispersions of this invention, whether aqueous or edible oil dispersions, appear to remain, to a large extent, in a form that can readily be exchanged with micellar cholesterol and can effectively compete for cholesterol either at the micelle or at the mucosa surface.

Still another object of the present invention is to provide a plant sterol-emulsifier dispersion suitable for incorporation into a food product, said plant sterol-emulsifier dispersion comprising a dispersion of about 75 to about 99.9 percent plant sterol and about 0.1 to about 25 percent emulsifier, wherein the plant sterol and emulsifier are micromilled in water or the edible oil at, close to, or below ambient temperature to form the plant sterol-emulsifier dispersion, wherein the plant sterol-emulsifier dispersion has an average particle size of about 1 to about 40 microns, and wherein the plant sterol-emulsifier dispersion can be incorporated into the food product in an amount effective to reduce serum cholesterol levels in a human consuming the food product without adversely modifying the texture of the food product.

Another object of the present invention is to provide a method of forming a plant sterol-emulsifier dispersion in water or an edible oil suitable for use in a food product, said method comprising: (1) forming a mixture of a blend of about 75 to about 99.9 percent plant sterol and about 0.1 to about 25 percent emulsifier in an aqueous or oil phase, wherein the mixture includes about 1 to about 80 percent of the blend and about 20 to about 99 percent water or edible oil; and (2) micromilling the mixture at, close to, or below ambient temperature to form the plant sterol-emulsifier dispersion, wherein the plant sterol-emulsifier dispersion has an average particle size of about 1 to about 40 microns and wherein the plant sterol-emulsifier dispersion can be incorporated into the food product in an amount effective to reduce serum cholesterol levels in a human consuming the food product without adversely modifying the texture of the food product. Preferably the mixture includes about 70 to about 90 percent water or edible oil.

These and other objects and advantages of the present invention will be apparent to those skilled in the art upon a consideration of the present specification.

DETAILED DESCRIPTION OF THE INVENTION

The present invention provides full-fat, low-fat, fat-free, and triglyceride-free food products which incorporate plant sterols as cholesterol-reducing compounds. The cholesterol-reducing compounds are incorporated into food products by adding them as micromilled plant sterol dispersions. These dispersions can be aqueous dispersions or edible oil dispersions. To form the desired aqueous plant sterol dispersions, the plant sterol is mixed with an emulsifier in a water solvent to form a coarse dispersion and then the coarse dispersion is micromilled at, close to, or below ambient temperature to form the desired plant sterol dispersion having an average plant sterol particle size of about 1 to about 40 microns. To form the desired plant sterol oil dispersion, the plant sterol is mixed an edible oil solvent to form a coarse dispersion and then the coarse dispersion is micromilled at, close to, or below ambient temperature to form, after the addition of the emulsifier, the desired plant sterol dispersion having an average plant sterol particle size of about 1 to about 40 microns. In preparing such plant sterol oil dispersions, the emulsifier may be added to the coarse dispersion and micromilled with the plant sterol or added to the micromilled plant sterol. Generally, it is preferred that the emulsifier is micromilled with the plant sterol in order to ensure homogenous distribution of the emulsifier. Preferably the average plant sterol particle size is about 1 to about 20 microns, and more preferably about 1 to about 10 microns.

The plant sterol dispersions, whether aqueous or oil based, can be directly incorporated into full-fat, low-fat, fat-free, and triglyceride-free food products in a cholesterol-reducing amount without imparting gritty texture or other undesirable organoleptic properties to the resulting food products. Such food products include, but are not limited to, pourable dressings, spoonable dressings, drinks, confections, ice creams, whipped desserts, whipped toppings, frozen dairy foods, dairy products (e.g., milk, yogurt, cheese, cream cheese, process cheese, and the like), dips, sauces, soups, deserts, dessert toppings, chocolate products, spreads, sour cream products, cream cheese products, and the like. The use of such micromilled plant sterol dispersion (in either water or edible oil systems) allows the incorporation of the plant sterol in food products at a relatively high level without producing a gritty texture. Moreover, since these dispersions can be water- or edible oil-based, they provide great flexibility in the manufacturing process. Aqueous dispersions of micromilled plant sterols, for example, can be used to produce low-fat or fat-free food products. In most cases, such plant sterol dispersions can be added to the desired food product with only minimal modification to existing food production lines. Although the micromilled plant sterol dispersions of this invention are mainly intended to be used in food products, they can, of course, also be used in pharmaceutical preparations for their cholesterol-reducing effect.

The plant sterol-emulsifier dispersion of this invention can be used in full-fat, reduced fat, low-fat, fat-free, or triglyceride-free food products. For purposes of this invention, the term "full-fat" is generally used as it is currently defined by the FDA Standards of Identity. In addition, the term "low-fat" includes "reduced-fat," "light," "low-fat," and "fat-free" as defined by the Standards of Identity. In addition, for purposes of this invention, "low-fat" also encompasses triglyceride-free products although they are not included in the Standards of Identity. However, the term "fat-free" is intended to include only "fat-free" as defined by the Standards of Identity. In addition, the terms "full-fat", "low-fat" and "fat-free" are intended to include full-fat, low-fat, and fat-free food products that do not fall into the categories defined by the Standards of Identity (as of the time of this disclosure) but deliver to the consumer either full-fat or reduced levels of fat per serving. Furthermore, a composition containing high levels of plant sterols in an aqueous dispersion may be described as "triglyceride-free" for purposes of this invention even though they may not be termed "fat-free" under the current Standards of Identity.

In one embodiment of the invention, an aqueous plant sterol-emulsifier dispersion suitable for incorporation into food products is provided, wherein a mixture of a plant sterol and an emulsifier in an aqueous medium is micromilled at, close to, or below ambient temperatures to form the aqueous dispersion having an average particle size of about 1 to about 40 microns. In another embodiment of the invention, an edible oil based plant sterol-emulsifier dispersion suitable for incorporation into food products is provided, wherein a mixture of a plant sterol and an emulsifier in an edible oil medium is micromilled at, close to, or below ambient temperatures to form the edible oil based dispersion having an average particle size of about 1 to about 40 microns. In still another embodiment of the invention, an edible oil based plant sterol-emulsifier dispersion suitable for incorporation into food products is provided, wherein a mixture of a plant sterol in an edible oil medium is micromilled at, close to, or below ambient temperatures to form the edible oil based dispersion having an average particle size of about 1 to about 40 microns, after which the emulsifier is added and blended into the dispersion. In other words, the edible oil-based dispersion can be prepared by micromilling the plant sterol with the edible oil in the presence or absence of the emulsifier. Where the emulsifier is not present during micromilling, it can be added directly to the plant sterol-edible oil dispersion. Of course, a portion of the emulsifier may be added to the coarse plant sterol dispersion before micromilling and the remainder added after micromilling.

Generally such plant-sterol emulsifier dispersions comprise a mixture of about 75 to about 99.9 percent plant sterol and about 0.1 to about 25 percent emulsifier in the desired solvent system. Preferably, mixture contains about 90 to about 99.8 percent plant sterol and about 0.2 to about 10 percent emulsifier. The plant sterol and the emulsifier are mixed together to form a mixture in the desired solvent system and then micromilled to achieve the desired average particle size. The plant sterol-emulsifier dispersions can be incorporated into food products to provide an amount of the plant sterol effective to reduce serum cholesterol levels in a human consuming such food products without adversely modifying the texture of the food products.

In another important embodiment of the invention, a plant sterol-emulsifier dispersion comprises about 1 to about 80 percent of a plant sterol/emulsifier blend and about 20 to about 99 percent of a solvent (i.e., water or edible oil). Preferably, the plant sterol-emulsifier dispersion comprises about 1 to about 60 percent of the plant sterol/emulsifier blend and about 40 to about 99 percent of the solvent (i.e., water or edible oil). The plant sterol-dispersion generally comprises about 10 to about 30 percent plant sterol/ emulsifier blend and about 70 to about 90 percent solvent. Preferably, the plant sterol/emulsifier blend contains about 75 to about 99.9 percent plant sterol and about 0.1 to about 25 percent emulsifier. More preferably, the plant sterol/ emulsifier blend about 90 to about 99.8 percent plant sterol and about 0.2 to about 10 percent emulsifier. The plant sterol, the emulsifier, and the solvent are mixed together to form a mixture. The mixture is then micromilled at, close to, or below ambient temperatures to form the desired plant sterol dispersion.

Suitable emulsifiers include propylene glycol monoester, polyglycerol esters, polyglycerol polyricinoleates, lecithin, modified lecithins, lactylated monoglycerides, sodium stearoyl lactylate, citric acid esters, diacetyl tartaric acid monoesters, acetic acid esters of monoglycerides, polyoxyethylene sorbitan esters, sucrose esters, monoglycerides, protein emulsifiers (e.g., eggs, milk proteins, whey proteins, and the like), and mixtures thereof. The dispersion may be water or oil based. For water- and especially for oil-based dispersions, polyglycerol esters and polyglycerol polyricinoleates are preferred. Suitable edible oils for use in preparing the oil-based dispersions include, for example, vegetable oil, olive oil, corn oil, soybean oil, canola oil, sunflower seed oil, peanut oil, rapeseed oil, sucrose fatty acid polyesters, and the like, as well as mixtures thereof. Other known edible oils may also be used. A single edible oil or mixtures of such edible oils may be used. For purposes of this invention, edible oils also include fats such as cocoa butter, butter fat, and the like. For use in the present invention, such fats are generally melted before micromilling.

The micromilled plant sterol dispersion can be prepared using any conventional micromilling apparatus. Generally, the plant sterol, emulsifier, and solvent (i.e., water or edible oil) are mixed together and then introduced into the micromilling apparatus. The dispersion is formed by micromilling the mixture for a sufficient time to form the desired average particle size. Suitable micromilling techniques and equipment include, for example, ball mills, horizontal media mills, ring mills, colloid mills, and the like. The mixture is micromilled until a dispersion having an average particle size of about 1 to about 40 microns is obtained. Using a horizontal media mill equipped with 1 to 2.5 mm diameter zirconia/silica balls, a suitable dispersion can generally be obtained using a single pass through the mill. Of course, other equipment or parameters can be employed so long as the desired average particle size is obtained in a reasonable time period. Generally, a relatively narrow particle size distribution is preferred so that the number of particles having a diameter greater than about 60 microns is minimized (i.e., generally such large particles should be less than about 10 percent, and preferably less than about 1 percent). The inclusion of significant numbers of such larger particles could result in a "gritty" texture or mouthfeel and may adversely affect emulsion stability. If desired, filtering equipment or apparatus could be used to remove such large particles. The micromilling should be carried out either (1) at or close to ambient temperatures (i.e., about 20 to about 50° C., preferably about 20 to 30° C., and more preferably about 23 to about 27° C.) or (2) below ambient temperatures (i.e., below about 20° C. and more preferably at about 0 to about 15° C.). Preferably temperature control is used during the micromilling process to maintain the temperature within these ranges. Temperature control is especially important when using oil as the solvent since significantly increased temperatures may increase the amount of plant sterol dissolved in the oil which could later form large undesirable crystals in the food product. Needle-like crystal formation is especially undesirable as they can lead to emulsion destabilization by bridging the oil droplets. It has been found that certain polyglycerol esters and polyglycerol polyricinoleates (i.e., Grindsted PGE 55 AK polyglycerol esters and Grindsted PGPR 90polyglycerol polyricinoleates, both of which are available from Danisco A/S) are especially beneficial in retarding undesirable crystal growth, especially the needle-like crystal growth, when either water- or oil-based dispersions are incorporated into an emulsion-based food product (e.g., salad dressings, mayonnaise-type products, margarines, table spreads, and the like). Although not wished to be limited by theory, it is believed that these specific emulsifiers have the proper hydrophobic-hydrophillic properties that allow them to coat any microcrystals that may be present and effectively retard their growth, thereby more effectively preventing the formation of needle-shaped crystals. Thus, plant-sterol emulsifier dispersions prepared using these emulsifiers provide, when incorporated into emulsion-based food products, an even smoother mouthfeel and texture as well as more stable emulsions.

A wide variety of food products may be generated utilizing the present invention. The food products may range in fat content from full-fat to fat-free or triglyceride-free food products. In recent years, many efforts have been made to reduce the fat content of various foods, such as salad dressing, sour cream and frozen desserts. Using the present invention, if desired, large amounts of plant sterols (i.e., up to about 12 percent of the total food product) can be incorporated without adversely affecting the texture or other organoleptic properties of the food product. Thus, the plant sterol can be incorporated into food products and, thus, into normal diets, at cholesterol-reducing levels. Generally, it is preferred that the plant sterol dispersions are included in food products at levels which provide about 0.5 to about 1.5 grams plant sterol per serving.

The plant sterol dispersions as provided by the present invention allow the incorporation of the plant sterol into food products at cholesterol-reducing levels while avoiding the grittiness that arises in the use of conventional plant sterol compounds. Thus, the present invention allows the use of plant sterols in formulating food products and in amounts which are effective in reducing the serum cholesterol of humans who consume such food products. The present invention allows the incorporation of cholesterol-reducing amount of plant sterols in a form (i.e., the plant sterol-emulsifier dispersion) without the gritty textural qualities normally associated with plant sterols. Thus, the use of plant sterols in the plant sterol-emulsifier dispersions achieves health-promoting characteristics, higher levels of plant sterol incorporation, and desirable textural attributes.

Not only are the textural characteristics of the resulting food products improved by use of the plant sterol-emulsifier dispersions of the present invention, the stability of the resulting plant sterol-containing food compositions—especially when in the form of an emulsion—is also improved with the use of the plant sterol-emulsifier dispersions of the present invention. Often, plant sterols added alone to an oil-in-water emulsion composition will destabilize the emulsion, as evidenced by the release of free oil. In contrast, the addition of the plant sterol-emulsifier dispersions of this invention results in ready incorporation of the plant sterol into the emulsion, as evidenced by the lack of free oil released upon homogenization or during the normal shelf life. Indeed, greater stability is generally observed if the aqueous sterol slurry or dispersion is added after formation of the desired emulsion (i.e., after the homogenization step) since such later-added sterol particles do not interfere with the initial formation of the oil-in-water emulsions. Both simulated and actual shipping test confirm the desired emulsion stability of the micromilled sterol-containing emulsions.

The plant sterol-emulsifier complexes of this invention generally contain about 1 to about 80 percent of a blend of plant sterol and emulsifier and about 20 to about 99 of a solvent system (i.e., water or an edible oil). Preferably, the plant sterol-emulsifier complexes of this invention generally contain about 1 to about 60 percent of the blend of plant sterol and emulsifier and about 40 to about 99 of the solvent system (i.e., water or an edible oil). More preferably, the solvent system is included at about 70 to 90 percent. The plant sterol-emulsifier complexes of this invention may be prepared as water dispersions or as oil dispersions. The plant sterol-emulsifier dispersions and methods to formulate them may be used to generate a variety of full-fat, low-fat, fat-free and triglyceride-free products (e.g., pourable dressings, spoonable dressings, whipped desserts, whipped toppings, frozen dairy foods, dips, sauces, soups, yogurts, dessert toppings, spreads, sour cream products, cream cheese products, chocolate products, and the like.)

The examples that follows are intended to further describe and not to limit the invention. All percentages and ratios used in the present specification are by weight, unless otherwise indicated. All references cited in the present specification are incorporated by reference.

EXAMPLE 1

An emulsifier-plant sterol aqueous dispersion was prepared using plant sterols (melting temperature of about 120–130° C.) from Cargill, Incorporated (Minneapolis, Minn.) Polysorbate 60 (12 g) was heated in a microwave oven until clear. The heated Polysorbate 60 was then dispersed in water (3388 g) at a temperature of about 70° C. Free sterols (600 g) were then added and dispersed while maintaining the temperature at about room temperature. The resulting slurry was then pumped (about 180 g/min) through a pilot plant media mill (Model KDL Pilot from Willy A. Bachofen AG Maschinefabrik, Basel, Switzerland). The mill was loaded at about 85 percent of its volume with 2 mm zirconia-silica beads (S.E.P.R. Les Mirois, Cedex, France) and was operated at its maximum rotational speed. The temperature of the mixture passing through the mill was maintained below about 50° C. After two passes through the mill, a water dispersion having an average particle size of about 10 microns was obtained. The water dispersion contained about 0.3 percent emulsifier and about 15 percent sterols, with the balance being water.

EXAMPLE 2

This examples illustrates the use of the plant sterol aqueous dispersion of Example 1 to produce a pourable emulsion dressing containing about 3.3 percent plant sterols (equivalent to about 1 g plant sterols per 30 g serving). Salt (about 0.37 lbs) and sugar (about 0.87 lbs) were added to water (about 8.9 lbs) with mixing. A separate mixture of xanthan gum (about 35 g) and canola oil (about 200 g) was prepared and blended to ensure that the gum was well dispersed. The gum/oil slurry was then added to the water mixture with mixing; mixing was continued for about 3 minutes to allow the gum to hydrate. Polysorbate 60 (about 1.6 lbs) and additional canola oil (about 2.6 lbs) were then added with mixing . Vinegar (120 grain; 1.6 lbs) and lemon juice (about 53 g) were added; mixing was continued for at least one minutes. The resulting mixture was then homogenized by passage through a high shear hydroshear device (180 psi backpressure). The resulting oil-in-water emulsion (about 6.2 lbs) was placed in a Hobart mixture to which an aqueous plant sterol dispersion (about 1.8 lbs) as prepared in Example 1 was added with agitation. Appropriate spices and/or other additives can then be added; mixing was continued for about 3 minutes. The pourable dressing was dispensed into appropriate bottles and stored under conventional conditions.

The resulting pourable dressing had good storage stability and organoleptic properties as compared to conventional pourable dressings without gritty or other undesirable textures or mouthfeel. Additionally, the resulting pourable dressing contained plant sterols in amounts reported to be cholesterol reducing.

EXAMPLE 3

An emulsifier-plant sterol oil dispersion was prepared using plant sterols (melting temperature of about 120–130° C.) from Cargill, Incorporated (Minneapolis, Minn.). Polysorbate 60 (12 g) was dispersed in canola oil (3388 g) at about 30° C. using a mixer equipped with a three bladed stir rod. Free sterols (800 g) were then added to the emulsifier oil mixture with continued stirring at about 30° C. to form a slurry. Using a peristaltic pump, the slurry was pumped through a pilot plant media mill (Model KDL Pilot from Willy A. Bachofen AG Maschinefabrik, Basel, Switzerland) at a rate of 180 g/min. The mill was loaded at about 85 percent of its volume with 2 mm zirconia-silica beads (S.E.P.R. Les Mirois, Cedex, France) and was operated at its maximum rotational speed. The temperature of the mixture passing through the mill was maintained below about 50° C. After two passes through the mill, an oil water dispersion having an average particle size of about 10 microns was obtained. The oil dispersion contained about 0.3 percent emulsifier and about 20 percent sterols, with the balance being oil.

EXAMPLE 4

This examples illustrates the use of the plant sterol oil dispersion of Example 3 to produce a pourable emulsion dressing containing about 3.3 percent plant sterols (equivalent to about 1 g plant sterols per 30 g serving). Salt (about 0.28 lbs) and sugar (about 0.66 lbs) were added to water (about 9.7 lbs) with mixing. A separate mixture of xanthan gum (about 26 g) and canola oil (about 200 g) was prepared and blended to ensure that the gum was well dispersed. The gum/oil slurry was then added to the water mixture with mixing; mixing was continued for about 3 minutes to allow the gum to hydrate. The emulsifier/plant sterol/oil dispersion from Example 3 was then added to the water containing the hydrated gum. Additional canola oil (about 0.5 lbs) was then added with mixing. Vinegar (120 grain; 1.6 lbs) and lemon juice (about 53 g) were added; mixing was continued for at least one minutes. The resulting mixture was then homogenized by passage through a high shear hydroshear device (180 psi backpressure). Appropriate spices and/or other additives can then be added; mixing was continued for about 3 minutes. The pourable dressing was dispensed into appropriate bottles and stored under conventional conditions.

The resulting pourable dressing had good storage stability and organoleptic properties as compared to conventional pourable dressings without gritty or other undesirable textures or mouthfeel. Additionally, the resulting pourable dressing contained plant sterols in amounts reported to be cholesterol reducing.

EXAMPLE 5

This example illustrates the use of an aqueous plant sterol-emulsifier dispersion for the preparation of a yogurt product. Plant sterols (about 10 percent) were mixed with 2% whole milk, milk powder (about 2 percent), and gelatin (about 6 percent) and then micromilled at about 30° C. using essentially the same milling procedure as described in Example 1 to obtain an aqueous plant sterol-emulsifier dispersion having an average particle size of about 10 microns. Milk proteins from the milk provided the required emulsifiers. About 0.2 liters of the aqueous plant sterol-emulsifier dispersion was mixed with about 1.8 liters of 2% milk and pasteurized using conventional pasteurization conditions. After cooling to room temperature, about 100 ml yogurt containing active cultures was stirred into the mixture. The mixture was then held at about 70° F. for about 1 hour, stirred, and then held at about 70° F. for about an additional 14 hours. The resulting yogurt had good organoleptic properties while providing beneficial plant sterols.

EXAMPLE 6

A mixture of 30 percent free sterols and 4.2 percent lecithin (Lucas Meyer, Hamburg, German) was dispersed in melted cocoa butter with agitation. The resulting dispersion was fed to a micromill (Model KDL Pilot from Willy A. Bachofen AG Maschinefabrik, Basel, Switzerland) using a peristaltic pump at a rate of 180 g/min. The micromill was filled to about 70 percent volume with 2.0 to 2.5 mm Zirconia beads. The mixture was kept at 50° C. during the micromilling process. After two passes, the average particle size was about 20 microns. The resulting cocoa butter suspension was thick, creamy, and opaque. The cocoa butter suspension (about 30 percent sterol) was then mixed into a melted and conched chocolate mixture at 50° C. and tempered to produce a plant sterol-containing chocolate have mouthfeel and flavor comparable to conventional chocolate products.

EXAMPLE 7

A plant sterol (25 percent) and canola oil (75 percent) dispersion was micromilled using essentially the same procedure as in Example 3 (except that an emulsifier was not included). The resulting plant sterol/oil dispersion had an average particle size of about 20 microns. Various emulsifiers (about 10 percent) in canola oil were incorporated into the plant sterol/oil dispersions with through mixing. An aqueous phase (2 percent salt, 2 percent sugar, and vinegar to adjust the pH to about 3.5) was added to each emulsifier/plant sterol/oil mixture with thorough mixing and then examined using a polarizing microscope to determine to what extent the emulsifiers might retard crystal growth and especially long, needle-like crystal growth. The aqueous phase and plant sterol/oil dispersions were combined at about a 1/1 ratio.

When added at levels of about 0.01 to about 0.75 percent, two emulsifiers (i.e., Grindsted PGE 55 AK polyglycerol esters and Grindsted PGPR 90 polyglycerol polyricinoleates, both of which are available from Danisco A/S) gave significantly improved retardation of crystal growth. Other similar emulsifiers, even those having similar HLB values (i.e., about 2–4) or those of the same chemical type, did not perform as well with regard to prevention of crystal growth and/or increased emulsion stability. Although not wishing to be limited by theory, it is believed that these emulsifiers are able to coat any microcrystals that might form and prevent, or at least significantly retard, further crystal growth.

We claim:

1. A plant sterol-emulsifier dispersion suitable for incorporation into food products, said plant sterol-emulsifier dispersion comprising a mixture of about 1 to about 80 percent of an plant sterol-emulsifier blend and about 20 to about 99 percent of an edible oil, wherein the plant sterol-emulsifier blend comprises about 75 to about 99.9 percent of a plant sterol and about 0.1 to about 25 percent of an emulsifier, wherein the mixture is micromilled at, or close to, or below ambient temperatures to form the plant sterol-emulsifier dispersion having an average particle size of about 1 to about 40 microns and wherein the plant sterol-emulsifier dispersion can be incorporated into food products in an amount effective to reduce serum cholesterol levels in a human consuming the food products without adversely modifying the texture of the food products.

2. The plant sterol-emulsifier dispersion as defined in claim 1, wherein the mixture comprises about 10 to about 30 percent of the plant sterol-emulsifier blend and about 70 to about 90 percent of the solvent and wherein the plant sterol-emulsifier blend comprises about 90 to about 99.8 percent of the plant sterol and about 0.2 to about 10 percent of the emulsifier.

3. The plant sterol-emulsifier dispersion as defined in claim 1, wherein the dispersion has an average particle size of about 1 to about 20 microns.

4. The plant sterol-emulsifier dispersion as defined in claim 3, wherein the edible oil is selected from the group consisting of soy bean oil, vegetable oil, olive oil, corn oil, canola oil, sunflower seed oil, peanut oil, rapeseed oil, sucrose fatty acid polyesters, cocoa butter, butter fat, and mixtures thereof.

5. The plant sterol-emulsifier dispersion as defined in claim 4, wherein the emulsifier is selected from the group consisting of propylene glycol monoester, polyglycerol esters, polyglycerol polyricinoleates, lecithin, modified lecithins, lactylated monoglycerides, sodium stearoyl lactylate, citric acid esters, diacetyl tartaric acid monoesters, acetic acid esters of monoglycerides, polyoxyethylene sorbitan esters, sucrose esters, monoglycerides, protein emulsifiers, and mixtures thereof.

6. The plant sterol-emulsifier dispersion as defined in claim 5, wherein the emulsifier is a polyglycerol ester or a polyglycerol polyricinoleate.

7. The plant sterol-emulsifier dispersion as defined in claim 1, wherein the emulsifier is selected from the group consisting of propylene glycol monoester, polyglycerol esters, polyglycerol polyricinoleates, lecithin, modified lecithins, lactylated monoglycerides, sodium stearoyl lactylate, citric acid esters, diacetyl tartaric acid monoesters, acetic acid esters of monoglycerides, polyoxyethylene sorbitan esters, sucrose esters, monoglycerides, protein emulsifiers, and mixtures thereof.

8. The plant sterol-emulsifier dispersion as defined in claim 7, wherein the emulsifier is a polyglycerol ester or a polyglycerol polyricinoleate.

9. The plant sterol-emulsifier dispersion as defined in claim 1, wherein the plant sterol is a sterol.

10. The plant sterol-emulsifier dispersion as defined in claim 1, wherein the plant sterol is a stanol.

11. The plant sterol-emulsifier dispersion as defined in claim 1, wherein the plant sterol is a mixture of a sterol and a stanol.

12. A method of forming a plant sterol-emulsifier dispersion for use in a food product, said method comprising (1) forming a first mixture of about 75 to about 99.9 percent of a plant sterol and about 0.1 to about 25 percent of an emulsifier, (2) mixing the first mixture with an edible oil to form a second mixture, and (3) micromilling the second mixture at, or close to, or below ambient temperature to form the plant sterol-emulsifier dispersion, wherein the average particle size of the plant sterol-emulsifier dispersion is about 1 to about 40 microns, wherein the plant sterol-emulsifier dispersion can be directly incorporated into the food product in an amount effective to reduce serum cholesterol levels in a human consuming such food product, without adversely modifying the texture of the food product.

13. The method as defined in claim 12, wherein the first mixture contains about 90 to about 99.8 percent of the plant sterol and about 0.2 to about 10 percent of the emulsifier and wherein the second mixture contains about 1 to about 80 percent of the first mixture and about 20 to about 99 percent of the solvent.

14. The method as defined in claim 13, wherein the emulsifier is selected from the group consisting of propylene glycol monoester, polyglycerol esters, polyglycerol polyricinoleates, lecithin, modified lecithins, lactylated monoglycerides, sodium stearoyl lactylate, citric acid esters, diacetyl tartaric acid monoesters, acetic acid esters of monoglycerides, polyoxyethylene sorbitan esters, sucrose esters, monoglycerides, protein emulsifiers, and mixtures thereof.

15. The method as defined in claim 14, wherein the emulsifier is a polyglycerol ester or a polyglycerol polyricinoleate.

16. The method as defined in claim 12, wherein the dispersion has an average particle size of about 1 to about 20 microns.

17. The method as defined in claim 16, wherein the edible oil is selected from the group consisting of soy bean oil, vegetable oil, olive oil, corn oil, canola oil, sunflower seed oil, peanut oil, rapeseed oil, sucrose fatty acid polyesters, cocoa butter, butter fat, and mixtures thereof.

18. The method as defined in claim 17, wherein the emulsifier is selected from the group consisting of propylene glycol monoester, polyglycerol esters, polyglycerol polyricinoleates, lecithin, modified lecithins, lactylated monoglycerides, sodium stearoyl lactylate, citric acid esters, diacetyl tartaric acid monoesters, acetic acid esters of monoglycerides, polyoxyethylene sorbitan esters, sucrose esters, monoglycerides, protein emulsifiers, and mixtures thereof.

19. The method as defined in claim 18, wherein the emulsifier is a polyglycerol ester or a polyglycerol polyricinoleate.

20. The method as defined in claim 12, wherein the plant sterol is a sterol.

21. The method as defined in claim 12, wherein the plant sterol is a stanol.

22. The method as defined in claim 12, wherein the plant sterol is a mixture of a sterol and a stanol.

23. A food product containing a cholesterol-reducing amount of a plant sterol wherein the plant sterol is incorporated into the food product using an edible oil dispersion of a mixture of a plant sterol and an emulsifier, wherein the dispersion is prepared by micromilling a mixture of about 75 to about 99.9 percent plant sterol and about 0.1 to about 25 percent of the emulsifier in the edible oil and at a temperature at, close to, or below ambient temperature, wherein the dispersion has an average particle size of about 1 to about 40 microns, and wherein the dispersion does not adversely affect the texture of the food product.

24. The food product as defined in claim 23, wherein the dispersion has an average particle size of about 1 to about 20 microns.

25. The food product as defined in claim 24, wherein the edible oil is selected from the group consisting of soy bean oil, vegetable oil, olive oil, corn oil, canola oil, sunflower seed oil, peanut oil, rapeseed oil, sucrose fatty acid polyesters, cocoa butter, butter fat, and mixtures thereof.

26. The food product as defined in claim 25, wherein the emulsifier is selected from the group consisting of propylene glycol monoester, polyglycerol esters, polyglycerol polyricinoleates, lecithin, modified lecithins, lactylated monoglycerides, sodium stearoyl lactylate, citric acid esters, diacetyl tartaric acid monoesters, acetic acid esters of monoglycerides, polyoxyethylene sorbitan esters, sucrose esters, monoglycerides, protein emulsifiers, and mixtures thereof.

27. The food product dispersion as defined in claim 26, wherein the emulsifier is a polyglycerol ester or a polyglycerol polyricinoleate.

28. The food product as defined in claim 24, wherein the emulsifier is selected from the group consisting of propylene glycol monoester, polyglycerol esters, polyglycerol polyricinoleates, lecithin, modified lecithins, lactylated monoglycerides, sodium stearoyl lactylate, citric acid esters, diacetyl tartaric acid monoesters, acetic acid esters of monoglycerides, polyoxyethylene sorbitan esters, sucrose esters, monoglycerides, protein emulsifiers, and mixtures thereof.

29. The food product as defined in claim 28, wherein the emulsifier is a polyglycerol ester or a polyglycerol polyricinoleate.

30. The food product as defined in claim 23, wherein the plant sterol is a sterol.

31. The food product as defined in claim 23, wherein the plant sterol is a stanol.

32. The food product as defined in claim 23, wherein the plant sterol is a mixture of a sterol and a stanol.

33. The food product as defined in claim 23, wherein the mixture contains about 90 to about 99.8 percent of the plant steral and about 0.2 to about 10 percent of the emulsifier and wherein the dispersion contains about 1 to about 80 percent of the mixture and about 20 to about 99 percent of the edible oil.

34. The food product as defined in claim 33, wherein the dispersion contains about 10 to about 30 percent of the mixture and about 70 to about 90 percent of the edible oil.

35. A plant sterol-emulsifier dispersion suitable for incorporation into food products, said plant sterol-emulsifier dispersion comprising about 0.1 to about 80 percent plant sterol, about 0.1 to about 15 percent emulsifier, and about 20 to about 99 percent edible oil, wherein the plant sterol and the edible oil are micromilled at, close to, or below ambient temperature to form an edible oil dispersion having an average particle size of about 1 to about 40 microns and wherein the emulsifier is then incorporated into the edible oil dispersion to form the plant sterol-emulsifier dispersion; whereby the plant sterol-emulsifier dispersion can be directly incorporated into food products in an amount effective to reduce serum cholesterol levels in a human consuming such food products, without adversely modifying the texture of the food products.

36. The plant sterol-emulsifier dispersion as defined in claim 35, wherein the dispersion has an average particle size of about 1 to about 20 microns.

37. The plant sterol-emulsifier dispersion as defined in claim 35, wherein the edible oil is selected from the group consisting of soy bean oil, vegetable oil, olive oil, corn oil, canola oil, sunflower seed oil, peanut oil, rapeseed oil, sucrose fatty acid polyesters, cocoa butter, butter fat, and mixtures thereof.

38. The plant sterol-emulsifier dispersion as defined in claim 37, wherein the emulsifier is selected from the group consisting of propylene glycol monoester, polyglycerol esters, polyglycerol polyricinoleates, lecithin, modified lecithins, lactylated monoglycerides, sodium stearoyl lactylate, citric acid esters, diacetyl tartaric acid monoesters, acetic acid esters of monoglycerides, polyoxyethylene sorbitan esters, sucrose esters, monoglycerides, protein emulsifiers, and mixtures thereof.

39. The plant sterol-emulsifier dispersion as defined in claim 38, wherein the emulsifier is a polyglycerol ester or a polyglycerol polyricinoleate.

40. The plant sterol-emulsifier dispersion as defined in claim 35, wherein the emulsifier is selected from the group consisting of propylene glycol monoester, polyglycerol esters, polyglycerol polyricinoleates, lecithin, modified lecithins, lactylated monoglycerides, sodium stearoyl lactylate, citric acid esters, diacetyl tartaric acid monoesters, acetic acid esters of monoglycerides, polyoxyethylene sorbitan esters, sucrose esters, monoglycerides, protein emulsifiers, and mixtures thereof.

41. The plant sterol-emulsifier dispersion as defined in claim 40, wherein the emulsifier is a polyglycerol ester or a polyglycerol polyricinoleate.

42. The plant sterol-emulsifier dispersion as defined in claim 35, wherein the plant sterol is a sterol.

43. The plant sterol-emulsifier dispersion as defined in claim 35, wherein the plant sterol is a stanol.

44. The plant sterol-emulsifier dispersion as defined in claim 35, wherein the plant sterol is a mixture of a sterol and a stanol.

45. A method of forming a plant sterol-emulsifier dispersion for use in a food product, said method comprising (1) micromilling a plant sterol in an edible oil at, close to, or below ambient temperature to form a plant sterol dispersion, wherein the average particle size of the plant sterol dispersion is about 1 to about 40 microns; and (2) incorporating an emulsifier into the plant sterol dispersion to form the plant sterol-emulsifier dispersion, wherein the plant sterol-emulsifier dispersion contains about 0.1 to about 80 percent plant sterol, about 0.1 to about 15 percent emulsifier, and about 20 to about 99 percent edible oil and wherein the plant sterol-emulsifier dispersion can be directly incorporated into the food product in an amount effective to reduce serum cholesterol levels in a human consuming such food product, without adversely modifying the texture of the food product.

46. The method as defined in claim 45, wherein average particle size of the plant sterol dispersion is about 1 to about 20 microns.

47. The method as defined in claim 45, wherein the edible oil is selected from the group consisting of soy bean oil, vegetable oil, olive oil, corn oil, canola oil, sunflower seed oil, peanut oil, rapeseed oil, sucrose fatty acid polyesters, cocoa butter, butter fat, and mixtures thereof.

48. The method as defined in claim 47, wherein the emulsifier is selected from the group consisting of propylene glycol monoester, polyglycerol esters, polyglycerol polyricinoleates, lecithin, modified lecithins, lactylated monoglycerides, sodium stearoyl lactylate, citric acid esters, diacetyl tartaric acid monoesters, acetic acid esters of monoglycerides, polyoxyethylene sorbitan esters, sucrose esters, monoglycerides, protein emulsifiers, and mixtures thereof.

49. The method as defined in claim 48, wherein the emulsifier is a polyglycerol ester or a polyglycerol polyricinoleate.

50. The method as defined in claim 48, wherein the plant sterol is a sterol.

51. The method as defined in claim 48, wherein the plant sterol is a stanol.

52. The plant sterol-emulsifier dispersion as defined in claim 48, wherein the plant sterol is a mixture of a sterol and a stanol.

53. The method as defined in claim 47, wherein the emulsifier is a polyglycerol ester or a polyglycerol polyricinoleate.

54. A plant sterol-emulsifier dispersion suitable for incorporation into food products, said plant sterol-emulsifier dispersion comprising a mixture of about 1 to about 80 percent of an plant sterol-emulsifier blend and about 20 to about 99 percent of a solvent, wherein the plant sterol-emulsifier blend comprises about 75 to about 99.9 percent of a plant sterol and about 0.1 to about 25 percent of an emulsifier, wherein the mixture is micromilled at, or close to, or below ambient temperatures to form the plant sterol-emulsifier dispersion having an average particle size of about 1 to about 40 microns, wherein the solvent is water or an edible oil, wherein the plant sterol-emulsifier dispersion can be incorporated into food products in an amount effective to reduce serum cholesterol levels in a human consuming the food products without adversely modifying the texture of the food products, and wherein the emulsifier is a polyglycerol ester or a polyglycerol polyricinoleate.

55. A method of forming a plant sterol-emulsifier dispersion for use in a food product, said method comprising (1) forming a first mixture of about 75 to about 99.9 percent of a plant sterol and about 0.1 to about 25 percent of an emulsifier, (2) mixing the first mixture with water or an edible oil to form a second mixture, and (3) micromilling the second mixture at, or close to, or below ambient temperature to form the plant sterol-emulsifier dispersion, wherein the average particle size of the plant sterol-emulsifier dispersion is about 1 to about 40 microns, wherein the plant sterol-emulsifier dispersion can be directly incorporated into the food product in an amount effective to reduce serum cholesterol levels in a human consuming such food product, without adversely modifying the texture of the food product, and wherein the emulsifier is a polyglycerol ester or a polyglycerol polyricinoleate.

56. A food product containing a cholesterol-reducing amount of a plant sterol wherein the plant sterol is incorporated into the food product using a water or edible oil dispersion of a mixture of a plant sterol and an emulsifier, wherein the dispersion is prepared by micromilling a mixture of about 75 to about 99.9 percent plant sterol and about 0.1 to about 25 percent of the emulsifier in water or the edible oil and at a temperature at, close to, or below ambient temperature, wherein the dispersion has an average particle size of about 1 to about 40 microns, wherein the dispersion does not adversely affect the texture of the food product, and wherein the emulsifier is a polyglycerol ester or a polyglycerol polyricinoleate.

\* \* \* \* \*